United States Patent [19]

Johnson

[11] Patent Number: 4,604,335

[45] Date of Patent: Aug. 5, 1986

[54] HIGH RATE CATHODE FORMULATION

[75] Inventor: Dennis P. Johnson, Naperville, Ill.

[73] Assignee: RAYOVAC Corporation

[21] Appl. No.: 708,891

[22] Filed: Mar. 6, 1985

[51] Int. Cl.$^4$ .................. H01M 4/40; H01M 4/48; H01M 4/04

[52] U.S. Cl. ..................... 429/197; 429/218; 429/220; 429/221; 252/182.1

[58] Field of Search ............. 429/221, 194, 232, 218, 429/197, 220; 252/182.1

[56] References Cited

U.S. PATENT DOCUMENTS

| | | | |
|---|---|---|---|
| 4,018,970 | 4/1977 | Gabano | 429/194 |
| 4,163,829 | 8/1979 | Kronenberg | 429/194 |
| 4,207,383 | 6/1980 | Oliapuram | 429/221 |
| 4,302,520 | 11/1981 | Evans et al. | 429/221 |

FOREIGN PATENT DOCUMENTS 0046339  4/1979  Japan ................. 429/221

Primary Examiner—Donald L. Walton
Attorney, Agent, or Firm—Kenyon & Kenyon

[57] ABSTRACT

An alkali metal, non-aqueous electrolyte cell having a cathode active material with minor amounts of powdered zinc and sulfur. The process of making the cathode includes pelletizing the powdered cathode materials and heating the pellets to interdiffuse zinc and sulfur into the active material.

18 Claims, No Drawings

HIGH RATE CATHODE FORMULATION

This invention is directed towards non-aqueous electrolyte cells, with anodes of alkali metals, which have improved rate capacities.

BACKGROUND OF THE INVENTION

Non-aqueous electrolyte cells containing anodes of alkali metals such as lithium, calcium, sodium and the like and high-energy cathodes of FeS, $FeS_2$, CuO, CuS, $Bi_2S_3$ and the like are often limited by conductivity within the cathode. To overcome this limitation, it is well known to add a conducting material such as carbon or graphite to the cathode. The addition of these materials, however, is known to contribute to an initially high open current voltage in many non-aqueous cells with alkali metal anodes and high energy cathodes. While such cells proceed to their lower operating voltage after time, the initial high voltage is unacceptable for many cell or battery applications which require a unipotential discharge.

A solution to this problem is disclosed in U.S. Pat. No. 4,163,829, which teaches that non-aqueous cells containing alkali metal anodes and high energy cathodes, which also contain graphite or carbon within the cathode to improve the conductivity thereof, will exhibit improved open circuit voltage characteristics if metallic zinc is used in conjunction with the cathode. The mere presence of zinc in electrical and ionic contact with the cathode is said to be sufficient for purposes of the improvement disclosed by the patent. It is postulated that the zinc which may be a discrete layer, a coating, a screen, a porous strip or a powder, acts as a metallic reducing agent to overcome the deleterious effect on OCV of oxygen present on the surface of the graphite or carbon. U.S. Pat. No. 4,163,829 discloses that of the several alkali metals which may be used as the anode material, lithium is preferred.

That patent also discloses that FeS is a preferred high energy cathode material, that 3-methyl-2-oxazolidone, propylene or ethylene carbonate, 1,2 dimethoxyethane and 1,3 dioxolane are the preferred electrolyte solvents and $LiCF_3SO_3$ or $LiClO_4$ are the preferred ionizing solutes. However, following the teaching of U.S. Pat. No. 4,163,829 does not improve the rate capacity of the non-aqueous cells described therein.

Accordingly, it is a primary objective of this invention to provide a non-aqueous alkali anode cell having a high energy density cathode material intermixed with minor amounts of zinc and sulfur and an alkali metal anode which exhibits improved rate capacity.

Another primary objective of this invention is to provide a process for producing a non-aqueous, alkali anode cell having a powdered high density cathode material, in which the cathode, after being intermixed with minor amounts of zinc and sulfur is subjected to a differential heat treatment in a protective atmosphere, which exhibits improved rate capacity.

Another objective of the invention is to provide a lithium-organic electrolyte cell having an FeS cathode, intermixed with minor amounts of zinc and sulfur, which exhibits improved rate capacity.

Another objective of the invention is to provide a process for producing a lithium-organic electrolyte cell, having a cathode of FeS, produced from FeS powder which, after being intermixed with minor amounts of zinc and sulfur, is subjected to a differential heat treatment in a protective atmosphere, and exhibits improved rate capacity.

SUMMARY OF THE INVENTION

The invention relates to a non-aqueous electrolyte cell having an alkali metal anode and a solid cathode, said cathode, being comprised of an intermixed major amount of solid active cathode material, minor amount of zinc and sulfur, and possibly minor amount of other materials, is subjected, after pelletizing, to a diffusional heat treatment in a protective atmosphere. Cells of the invention exhibit an increased rate capability.

In accordance with the invention powder high energy cathode material is intermixed with powdered zinc and powdered sulfur in minor amounts, and then pelletized. The powdered zinc and powdered sulfur are present in the cathode in molar ratios ranging from approximately 1.5:1 to 1:1. The resulting pellets are given an interdiffusional heat treatment in a protective atmoshere. The particle sizes of the various powders should be in the range of about 5 to about 200 microns, preferably about 5 to 100 microns.

The interdiffusional heat treatment is performed at temperatures of 200° C. to about 300° C. from about 30 minutes to about 2 hours. The reactivities of the zinc, sulfur and the cathode materials at such elevated temperatures mandates that a protective atmosphere such as dry argon be employed during the interdiffusional heat treatment.

It should be recognized that as the particle size of the ingredients becomes finer, the time and temperature conditions necessary for the interdiffusion becomes less.

While the improvements determined in accordance with the invention are not fully understood, it is believed that the diffusional heat treatment produces an inert ZnS conductive material which intertwines the FeS particles, providing an improved rate capacity. While some rate capacity improvement may be seen upon the firing of certain high energy cathodes such as CuS, the improvement in rate capacity is more pronounced when the teachings of this invention are followed. This pronounced improvement most likely results from the electrochemically inactive matrix for the high energy discharge provided by the ZnS, whereas conductive matrices formed upon firing high energy cathodes outside of the scope of this invention are themselves electrochemically active and do not remain intact throughout the entire discharge of the cathode. If this explanation is correct, the invention should be applicable to combinations of known high energy cathode materials with or without activating materials, such as graphite and carbon.

The following examples illustrate the invention and give preferred embodiments of the invention.

EXAMPLE 1

A number of lithium-organic electrolyte cells was prepared using the cathode materials defined in Table 1. In each case, the organic electrolyte was 1.2M $LiClO_4$-50/50 v/o Propylene Carbonate/Dimethoxyethane. The cells were discharged through a 3000 ohm load to the endpoints shown in Table 1. Six cells were used for each test (except as noted).

TABLE 1

| Lot | Description of Cathode | Theor mAh | mAh to 1.2 v | mAh to 1.3 v | mAh to 1.4 v |
|---|---|---|---|---|---|
| 530 | 84.8 FeS/10.2 Zn/5S, 250° C./1 hr/argon | 54 (as FeS) | 35.0 | 28.7 | 5.5 |
| 529 | 86.3 FeS/8.7 Fe/5S, 250° C./1 hr/argon | 63 | 33.8 (4/6) | 25.3 (4/6) | 1 (4/6) |
| 314 | 100 FeS, 240° C./10 min | 92 | 27* | 21* | 1* |
| 313 | 90 FeS/10 Zn, 240° C./10 min | 82 | 26* | 23* | 1* |
| 312 | 90 FeS/10 Zn | 83 | 28* | 23* | 1* |
| 442 | 100 FeS | 61 | 29* | 1* | 0* |

*best cell

The results show the invention provides greater capacity to higher endpoints.

EXAMPLE 2

A number of other cells and configurations was produced and discharged under load with the results shown in Table II. The connotation "Fired" denotes a heat treatment at 250° C. under argon gas. Cells from the present invention (Lot 515594) delivered the best capacity over all the discharge loads.

Although the present invention has been described in conjunction with preferred embodiments, it is to be understood that modification and variations may be resorted to without departing from the spirit and scope of the invention, as those skilled in the art will readily understand. Such modifications and variations are considered to be within the purview and scope of the invention and appended claims.

TABLE II

| | RATE IMPROVEMENTS DUE TO FORMULATION CHANGES AND FIRING | | | | | | | | |
|---|---|---|---|---|---|---|---|---|---|
| | WEIGHT % | | | | | AVERAGE mAh TO 1.2 V (RANGE) | | | |
| LOT NUMBER | FeS | Zn | S | C | Binder | FIRED | 3K Ω | 6.5K Ω | 12.5K Ω | 25K Ω |
| 516036 (XR926) | 91 | 0 | 0 | 7 | 2 | No | 4(1–19) | 22(16–25) | 24(18–27) | 31(22–39) |
| 516037 (XR926) | 91 | 0 | 0. | 7 | 2 | Yes | 0 | 20(13–26) | 21(14–26) | 17(9–27) |
| 515313 (XR1121L) | 90 | 10 | 0 | 0 | 0 | Yes | 20(13–25) | No test | *38(30–43) | No test |
| 515312 (XR1121L) | 90 | 10 | 0 | 0 | 0 | No | 27(26–28) 18(0–28) | No test | 28(18–35) | No test |
| 515594 (XR1121A) | 85 | 10 | 5 | 0 | 0 | Yes | 32.5(31–34) | 42.2(39–43) | 47.5(46–49) | 48.2(48–50) |
| 515479 (XR1121A) | 91 | 0 | 0 | 7 | 2 | No | 28.2(27–30) | 32.8(29–36) | 36(33–38) | 36(35–38) |

*Outliers excluded
NOTES:
1. While relative comparisons can be made throughout the Table, absolute comparison can only be the same cell size and style.
2. XR926 is a button cell of size 9.5 mm diam. and 2.6 mm tall. XR1121 is a button cell with dimensions 11.5 mm diam. and 2.1 mm tall.
3. Numbers in parenthesis under Average mAh refer to the range of values observed.

What is claimed is:

1. An alkali metal anode, non-aqueous electrolyte cell having a solid cathode, said cathode comprising a major amount of a powdered high energy material, and a minor amount of a material intermixed with minor amounts of powdered zinc and powdered sulfur, the cathode material having been pelletized and heated in a protective atmosphere, which has an improved rate capability as compared to a similar cell having a cathode employing only the same high rate cathode material.

2. An alkali metal anode, non-aqueous electrolyte cell of claim 1 wherein the alkali anode material is selected from the group consisting of lithium, calcium and sodium.

3. An alkali metal anode, non-aqueous electrolyte cell of claim 2 wherein the alkali anode material is lithium.

4. An alkali metal anode, non-aqueous electrolyte cell of claim 1 wherein the high energy cathode material is selected from the group consisting of FeS, FeS$_2$, CuO, CuS, Cu$_2$S, and Bi$_2$S$_3$.

5. An alkali metal anode, non-aqueous electrolyte cell of claim 4 wherein the high energy cathode material is FeS.

6. An alkali metal anode, non-aqueous electrolyte cell of claim 1 wherein the solvents for the electrolyte are selected from the group consisting of 3-methyl-1-2-oxazolidone, propylene carbonate, ethylene carbonate, 1,2 dimethoxyethane and 1,3 dioxolane.

7. An alkali metal anode, non-aqueous electrolyte cell of claim 6 wherein the solvent for the electrolyte is a mixture of propylene carbonate and 1,2 dimethoxyethane.

8. An alkali metal anode, non-aqueous electrolyte cell of claim 1 wherein the solute of the electrolyte is selected from the group consisting of LiCF$_3$SO$_3$ and LiClO$_4$.

9. An alkali metal anode, non-aqueous electrolyte cell of claim 8 wherein the solute of the electrolyte is LiClO$_4$.

10. An alkali metal anode, non-aqueous electrolyte cell of claim 1 wherein the powdered zinc and the powdered sulfur are present in the cathode in molar ratios ranging from 1:1 to 1.5:1.

11. An alkali metal anode, non-aqueous electrolyte cell of claim 1 wherein the powdered zinc and powdered sulfur are present in the cathode in a 1:1 molar ratio.

12. The method for preparing a cathode for use in an alkali, non-aqueous electrolyte cell which comprises mixing high energy cathode material in major amount with a minor amount of powdered zinc and powdered sulfur, pelletizing said mixture and heating said pellets in a protective atmosphere to interdiffuse said zinc and sulfur in said high energy cathode material, which is capable of providing improved rate capability to said cell.

13. The method according to claim 12 wherein the particle size of the cathode components ranges from 5 to 200 microns.

14. The method according to claim 13 wherein the particle size of the cathode components ranges from 5 to 100 microns.

15. The method according to claim 12 wherein the heat treatment of the pelletized cathode is conducted at between 200° C. and 300° C.

16. The method according to claim 15 wherein the heat treatment of the pelletized cathode occurs for between 30 minutes and 2 hours.

17. The method according to claim 12 wherein the powdered zinc and the powdered sulfur are present in molar ratios ranging from 1.5:1 to 1:1.

18. The method according to claim 17 wherein the molar ratio is 1:1.

* * * * *